United States Patent [19]

Goebel

[11] 3,982,990
[45] Sept. 28, 1976

[54] FORMING APPARATUS

[76] Inventor: Ronald C. Goebel, Box 205A, R.D. 1, Pheasant Lane, Glen Mills, Pa. 19342

[22] Filed: Feb. 18, 1975

[21] Appl. No.: 550,230

[52] U.S. Cl. .............................. 156/443; 156/538; 156/580
[51] Int. Cl.² .................. B30B 7/04; B30B 9/38
[58] Field of Search .......... 156/212, 213, 216, 475, 156/479, 480, 492, 580, 443, 538

[56] References Cited
UNITED STATES PATENTS

| | | | |
|---|---|---|---|
| 2,739,637 | 3/1956 | Tyler | 156/492 |
| 2,937,689 | 5/1960 | Peterson | 156/479 |
| 3,028,275 | 4/1962 | Peterson et al. | 156/492 |
| 3,392,074 | 7/1968 | Bartron | 156/216 |
| 3,580,770 | 5/1971 | Dyal | 156/479 |
| 3,616,076 | 10/1971 | Gepkens | 156/216 |
| 3,668,033 | 6/1972 | Evans | 156/216 |

OTHER PUBLICATIONS
ALC-72 Service Manual, Bechtold Eng. Co., 1972.

*Primary Examiner*—William A. Powell
*Assistant Examiner*—Basil J. Lewris
*Attorney, Agent, or Firm*—Anthony J. McNulty; Martin L. Faigus

[57] ABSTRACT

An apparatus for forming countertops and the like from a laminated blank bends a side section of the blank to form a substantially vertical back splash and inserts a cove stick into a cove at the bend junction of the blank. The apparatus includes a work-supporting bed for supporting the laminated blank, a bend bar movably mounted with respect to the bed and fluid-actuated pressure means for forcing the bend bar against a side section of the laminated blank for bending the side section into a vertical back splash. A cove stick inserting assembly is connected to the bend bar and includes support means for supporting a cove stick adjacent a cove formed at the bend junction of the laminated blank after the bending operation, and fluid-actuated pressure means for inserting the cove stick into the cove to thereby complete the formation of the countertop.

11 Claims, 9 Drawing Figures

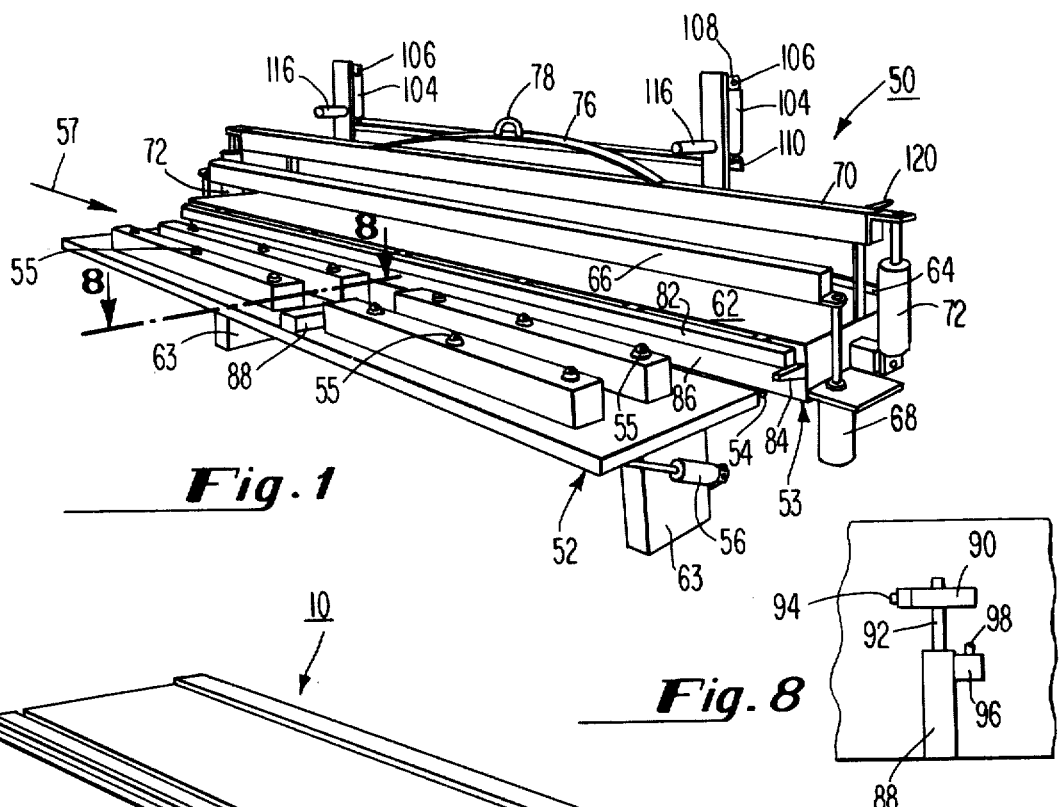
Fig. 1
Fig. 8
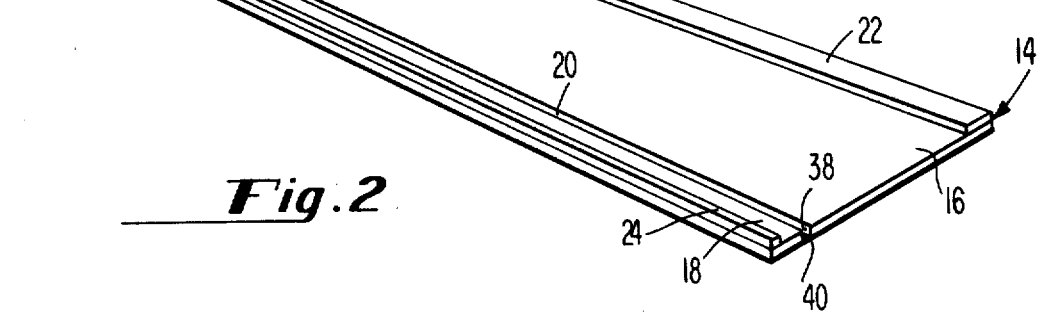
Fig. 2
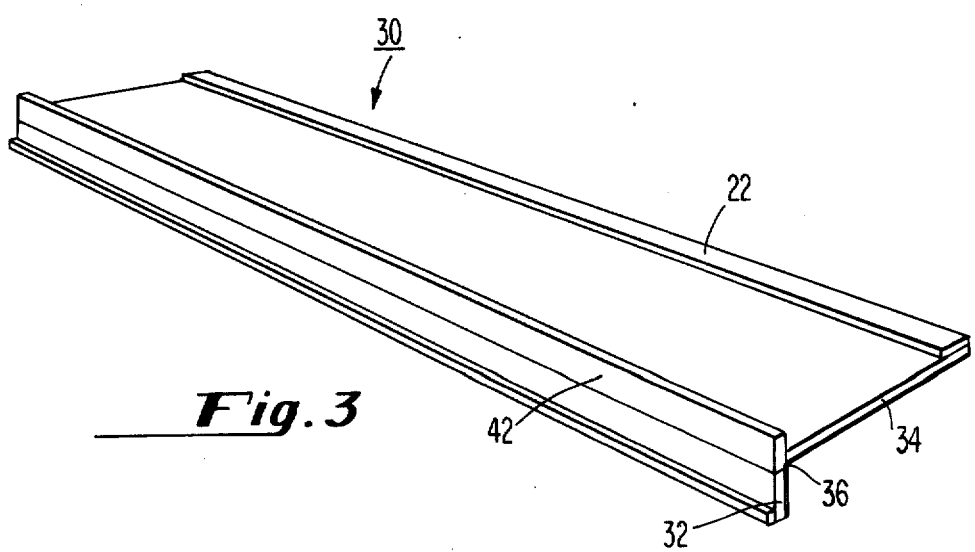
Fig. 3

FORMING APPARATUS

BACKGROUND OF THE INVENTION

1. Field of the Invention

This invention relates to an apparatus for forming countertops and the like from a laminated blank which includes a decorative thermoplastic sheet adhered to a support base by bending a side section of the blank into a substantially vertical back splash, and inserting a cove stick into a cove formed at the bend junction.

2. Description of the Prior Art

Apparatus for forming countertops with a vertical back splash are well known in the prior art as evidenced by the disclosures in U.S. Pat. Nos. 3,616,076, issued to Gepkens; 3,392,074, issued to Bartron; 3,668,033, issued to Evans and 3,028,275, issued to Peterson et al. These apparatus are complicated by the inclusion of mechanisms which aid in the performance of operations on a laminated blank in addition to the bending of the blank to form a vertical back splash and/or the securement of a cove stick in a cove formed at the bend junction of the blank. Specifically, in all of the above patented constructions mechanisms are provided for initially completing the formation of the laminated blank by bending ends of a thermoplastic sheet about the ends of a support base to adhere the ends of said sheet to said support base. Although some of the above apparatus support a laminated blank during the insertion of a cove stick into a cove formed at the bend junction between a vertical back splash and a substantially horizontal countertop section, none of these patented constructions include means for positively and automatically inserting the cove stick into the cove.

Many manufacturing establishments have exisiting equipment for completely fabricating a laminated blank which subsequently is to be formed into a countertop having a vertical back splash section. In these manufacturing establishments there is no need for complicated equipment of the type described in the above-referred to patents.

Relatively inexpensive, unautomated forming equipment does exist for bending a side section of a completely formed laminated blank into a vertical back splash. The Bechtold CT-12 coving machine, manufactured by Bechtold Engineering Company of Ft. Lauderdale, Florida, is representative of this type of equipment. In the Bechtold machine an operator manually forces a bend bar against a side section of the laminated blank to bend the side section into a substantially vertical back splash. This manual operation of the bend bar causes uncontrollable pressure variations during the bending operation, and these pressure variations can cause poor cove formation resulting in a large number of rejectable articles. In addition, manual operation of the bend bar causes operator fatigue which also contributes to unreliable operation of the machine.

In equipment for forming a back splash in a laminated blank a heater is generally employed to soften the thermoplastic sheet of the laminate prior to the bending operation. In equipment of the Bechtold type, the operator must use his own judgment to determine when the thermoplastic sheet is sufficiently pliable to be bent. If the operator actuates the bend bar before the sheet is sufficiently pliable, the bend junction may crack, and the countertop will be rejectable. Alternatively, if the sheet is heated for too long a period of time it may be marred or damaged, which also results in a rejectable article.

A further deficiency of the Bechtold type machine is that it does not include any device for automatically inserting a cove stick into a cove formed at the bend junction of the laminated blank. In the Bechtold type machine a cove stick must be manually inserted into the cove, and manual operations employed to clamp the cove stick in the cove until the cove stick is firmly secured to the blank, either by the setting up of an adhesive, or by the use of other fastening means, such as screws. These are fatiguing, time consuming operations.

To use the Bechtold CT-12 coving machine, two operators are required to manually lift the laminated blank and properly position it on a work-supporting bed. The lifting of the blank is a fatiguing operation, and the need for two operators, as opposed to one, increases manufacturing overhead costs. Both of these factors are undesirable.

In summary, the prior art forming devices for forming fully formed countertops from a completed formed laminated blank have required excessive manual operations leading to a lack of reliability in the manufacturing operation, and excessive manpower requirements leading to unnecessary overhead. The instant invention overcomes the above deficiencies in a simple, economical and reliable manner.

SUMMARY OF THE INVENTION

This invention relates to an apparatus for forming countertops and the like from a laminated blank by bending a side section of the blank into a substantially vertical back splash, and by automatically inserting a cove stick into a cove at the bend junction. The laminated blank is completely formed prior to being processed in the apparatus of this invention, and includes a decorative thermoplastic sheet, such as Formica, adhered by a suitable adhesive or cement to a support base of plywood, chipboard, or other suitable material.

The apparatus of this invention includes a work-supporting bed for supporting the laminated blank with a side section thereof extending beyond a side margin of said bed, and a fluid actuated pressure means for forcing a bend bar against the side section of the blank under a controlled pressure to bend said side section into a substantially vertical back splash. The apparatus of this invention further includes a cove stick inserting assembly connected to, and movable with the bend bar. The cove stick inserting assembly includes supporting structure for supporting the cove stick adjacent a cove formed at the bend junction of the laminated blank when the bend bar is in its final forming position, and fluid-actuated pressure means for both inserting the cove stick into the cove and applying positive pressure to said cove stick for pressing it into engagement with cove-defining surfaces of the support base adjacent the bend junction. Prior to actuation of the cove stick inserting assembly, a suitable adhesive, which preferably is fast-setting, is applied to the cove-defining surfaces of the support base so that the pressure applied to the cove stick through the fluid-actuated pressure means will affect a strong adhesive bond between the cove stick and the laminated blank.

The automated operation of the bend bar eliminates operator fatigue and enhances the operating efficiency of the apparatus by minimizing the number of rejectionable articles which are fabricated. The unique structural relationship between the bend bar and the cove stick inserting assembly is a simple, reliable arrangement for insuring that the cove stick will be properly inserted and clamped in the cove. Moreover, the automatic insertion of the cove stick into the cove is sufficiently fast to permit the use of a fast-setting and strong adhesive for retaining the cove stick in said cove. The use of such an adhesive eliminates the need for the time consuming operation of employing additional fastening means, such as screws, to retain the cove stick to the blank.

In a preferred embodiment of this invention a transport table is pivotally mounted adjacent the front side of the work-supporting bed. The upper surface of this table includes low friction support means, such as ball casters, to receive the laminated blank from upstream equipment employed to fabricate said blank. Accordingly, the laminated blank does not have to be manually carried to the apparatus and inserted on the work-supporting bed, and only a single operator is required to roll the laminated blank onto the work-supporting bed off of the transport table. Fluid-actuated pressure means is connected to the pivotally mounted support table, and is actuated after the laminated blank has been positioned on the work-supporting bed to lower the table so that it is out of the operator's way for the subsequent bending and cove inserting operations. Preferably, fluid-actuated pressure means for operating a hold-down platen to retain the laminated blank in proper position on the work-supporting bed during the bending operation is actuated simultaneously with the actuation of the fluid-actuated pressure means that moves the transport table to its lowered position. Accordingly, by the closing of a single switch, the transport table is lowered and the laminated blank is firmly clampled in proper position for the subsequent bending operation in which the vertical back splash is formed.

Other objects and advantages of this invention will become apparent upon reading the detailed description which follows, taken in conjunction with the drawings.

BRIEF DESCRIPTON OF THE DRAWINGS

FIG. 1 is a perspective view of a forming apparatus according to this invention;

FIG. 2 is a perspective view of a laminated blank which is formed into a countertop in the apparatus of this invention;

FIG. 3 is a perspective view of a fully formed countertop formed in the apparatus of this invention;

FIG. 8 is a fragmentary plan view of the transport table showing the fluid-actuated pressure means for controlling the operation of the bend bar.

DESCRIPTION OF THE PREFERRED EMBODIMENT OF THE INVENTION

Figure 4:
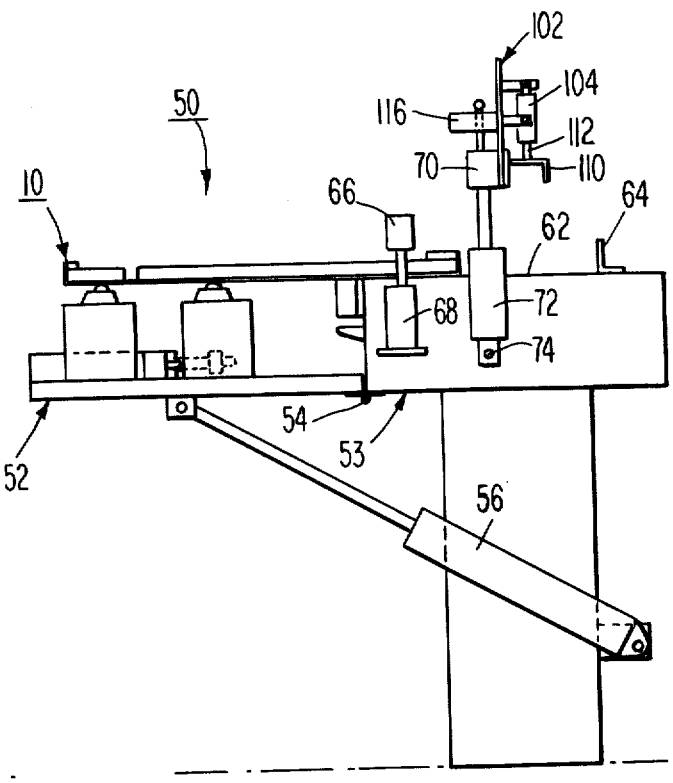
FIGS. 4, 5 and 6 are schematic and elevation views of the apparatus of this invention showing sequential steps in the formation of a countertop.

This invention relates to an apparatus for forming countertops and the like from a laminated blank by bending a side section of the blank into a substantially vertical back splash and by inserting a cove stick into a cove formed at the bend junction of the laminated blank.

Referring to FIG. 2, the laminated blank 10 which is formed into a countertop includes a decorative thermoplastic sheet 12, such as Formica, adhesively bonded to a support base 14 which can be formed of plywood, chipboard, or any other suitable material. The support base 14 includes two spaced base sections 16 and 18, respectively, defining a gap or space 20 therebetween. Optionally, the laminated blank 10 can include legs, or projections 22 and 24 extending outwardly beyond the support base 14 at opposite ends of said blank. These legs can be formed from strips of wood, or other suitable material which are adhesively bonded to the support base 14.

Referring to FIG. 3, a fully formed countertop 30, which is formed in the apparatus of this invention, includes a vertical back splash 32 joined to a substantially horizontal countertop section 34 through a bend junction 36. Side surfaces 38 and 40 of base sections 16 and 18, respectively, are disposed on opposite sides of the space 20, and, after the bending operation in which the vertical back splash 32 is formed, are disposed on opposite sides of the bend junction 36. The surfaces 38 and 40, along with the section of the thermoplastic sheet 12 disposed at the bend junction, define a cove into which a cove stick 42 is positioned. Prior to inserting the cove stick, a suitable adhesive, such as a fast-setting hot melt adhesive, is applied to the side surfaces 38 and 40 of the base sections 16 and 18, respectively, to firmly retain the cove stick 42 within the cove. This cove stick prevents the vertical back splash 32 from moving toward its unbent position as a result of the elastic memory of the thermoplastic sheet 12. In the preferred embodimemt of this invention the cove stick 42 is of a rectangular or a square cross-sectional configuration, and extends outwardly beyond the outer surface of base section 16 to define a leg having substantially the same height as leg 22. The leg 22 and the leg formed by the cove stick 42 are adapted to support the countertop 30 on a deck (not shown) to which it is to be mounted.

Referring to FIGS. 1 and 4, the forming apparatus 50 of this invention includes a transport table 52 adjacent the front side of a work station 53. The transport table 52 is pivotally journaled to the work station 53 at 54, and includes ball casters 55 on the upper surface thereof. Referring to FIG. 4, the transport table 52 is shown in its raised position for supporting the laminated blank 10 prior to its insertion into the work station 53. The laminated blank 10 preferably is fed directly onto the transport table 52 in the direction indicated by arrow 57 (FIG. 1) from upstream equipment (not shown) in which the laminated blank 10 is formed. The transport table 52 is movable between its raised position (FIG. 4) and a lowered position (FIG. 5) by a pair of pneumatic cylinders 56 (only one of which is shown) at opposite ends of the apparatus 50. Each cylinder 56 is pivotally journaled to the transport table at 58, and to a fixed frame member 60 at 61. The frame member 60 can be connected to supporting legs 63 of the work station 53.

Referring to FIGS. 1 and 4, the forming apparatus 50 includes a work-supporting bed 62 onto which the laminated blank 10 is directed from the transport table 52. A stop 64, in the form of an angle iron or other suitable abutment, is positioned in the path of movement of the laminated blank 10 for stopping said blank when it is properly positioned for subsequent formation into the countertop 30, as will be described hereinafter.

Figure 5:
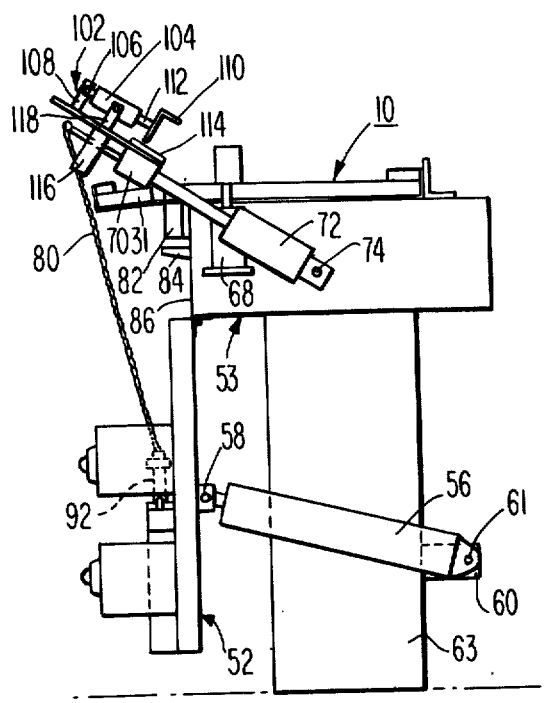

Referring to FIGS. 1 and 5, the laminated blank 10 is properly positioned for subsequent formation into a countertop 30 with a side section 31 of said blank disposed beyond the front side margin of the work-supporting bed 62. A hold-down bar or platen 66 is connected to pneumatic cylinders 68 (only one of which is shown in FIGS. 1 and 5) at opposite ends of the work station 53 and is adapted to be lowered by actuation of the pneumatic cylinders 68 to clamp the laminated blank 10 against the work supporting bed 62, as shown in FIG. 5.

Referring to FIGS. 1 and 5, a bend bar 70 extends for the full length of the work-supporting bed 62, and is mounted for pivotal movement through pneumatic cylinders 72 at opposite ends of the apparatus. Each of the pneumatic cylinders is pivotally journaled at 74 adjacent opposite ends of the work station 53 (only one journal 74 being shown in the FIGURES). The bend bar 70 includes a handle 76 (FIG. 1) which is engaged by an operator for manual movement to its bending position shown in FIG. 5. In addition, a connector ring 78 is integrally connected to the handle 76 and one end of a chain 80, or other connecting linkage, is secured thereto.

Referring to FIGS. 1 and 5, a heating rod 82 extends for the full length of the apparatus adjacent the front margin of the work-supporting bed 62. The outer surface of the heating rod 82 also functions as a die about which the side section 31 of the laminated blank 10 is bent during formation of the vertical back splash 32. A back splash stop 84 is secured to a side wall 86 adjacent the front of the work-supporting bed 62 for controlling the angle through which the side section 31 of the laminated blank is bent.

Referring to FIGS. 1 and 8, a pneumatic cylinder 88 is secured to the upper surface of the transport table 52. This pneumatic cylinder 88 includes a switch-actuating abutment 90 secured to the upper end of piston rod 92. A post, or projection 94 is connected to the abutment 90, and is adapated to receive the free end of the chain 80 thereon. The pneumatic cylinder 88 is normally in its fully extended position, and is adapted to be retracted to positively pull the bend bar 70 about its pivotal connection 74 for initially bending the side section 31 of the laminated blank 10 in a manner which will be described hereinafter. A valve 96 is positioned adjacent the pneumatic cylinder 88, and has an actuation button 98 which is depressed by the valve actuating abutment 90 when the piston rod 92 has been retracted to the position shown in FIG. 6. Depression of the actuation button 98 triggers the control valve 96 for retracting pneumatic cylinders 72. The retraction of pneumatic cylinders 72 causes the bend bar to push inwardly, in the direction indicated by arrow 100 in FIG. 6, to force the side section 31 of the laminated blank 10 into engagement with the back splash stop 84.

Referring to FIGS. 1 and 4 through 6, a cove stick inserting assembly 102 is connected to the bend bar 70, and includes a plurality of pneumatic cylinders 104 which are pivotally mounted at 106 to supporting frame members 108. The number of pneumatic cylinders 104 that are employed in the cove stick inserting assembly 102 is a matter of choice. An angle iron 110 is connected to the free end of piston rods 112 of the pneumatic cylinders 104, and the angle iron extends for substantially the full longitudinal extent of the apparatus. The angle iron 110 overlies a cove stick supporting platform 114. When the bend bar 70 is in its final forming position shown in FIG. 6, a cove stick is positioned on the supporting platform 114 underlying the angle iron 110.

A pneumatic cylinder 116 is pivotally journaled to each pneumatic cylinder 104 through a piston rod 118. Each of the pneumatic cylinders 116 is in an extended condition prior to actuation of the cove stick inserting assembly 102, and a switch 120 (FIG. 1) for controlling the operation of the pneumatic cylinders 104 and 116 is disposed adjacent one end of the forming apparatus 50.

The operation of the forming apparatus 50 will be described in conjunction with the circuit diagram shown in FIG. 9 and the other Figures described earlier. The circuit controls for the forming apparatus 50 can be included in a control box (not shown) located in any desired position on the forming apparatus 50. In a preferred embodiment the circuit controls which have not been shown in the drawings can be included in a control box mounted to structural supports of the apparatus 50 to overlie the work-supporting bed 62 in the same manner as in the Bechtold coving machine.

OPERATION

The laminated blank 10 (FIG. 2) is directed onto the transport table 52, which is in its raised position shown in FIGS. 1 and 4. An operator slides the blank 10 onto the work-supporting bed 62 into engagement with the stop 64 (FIG. 5).

Figure 9:
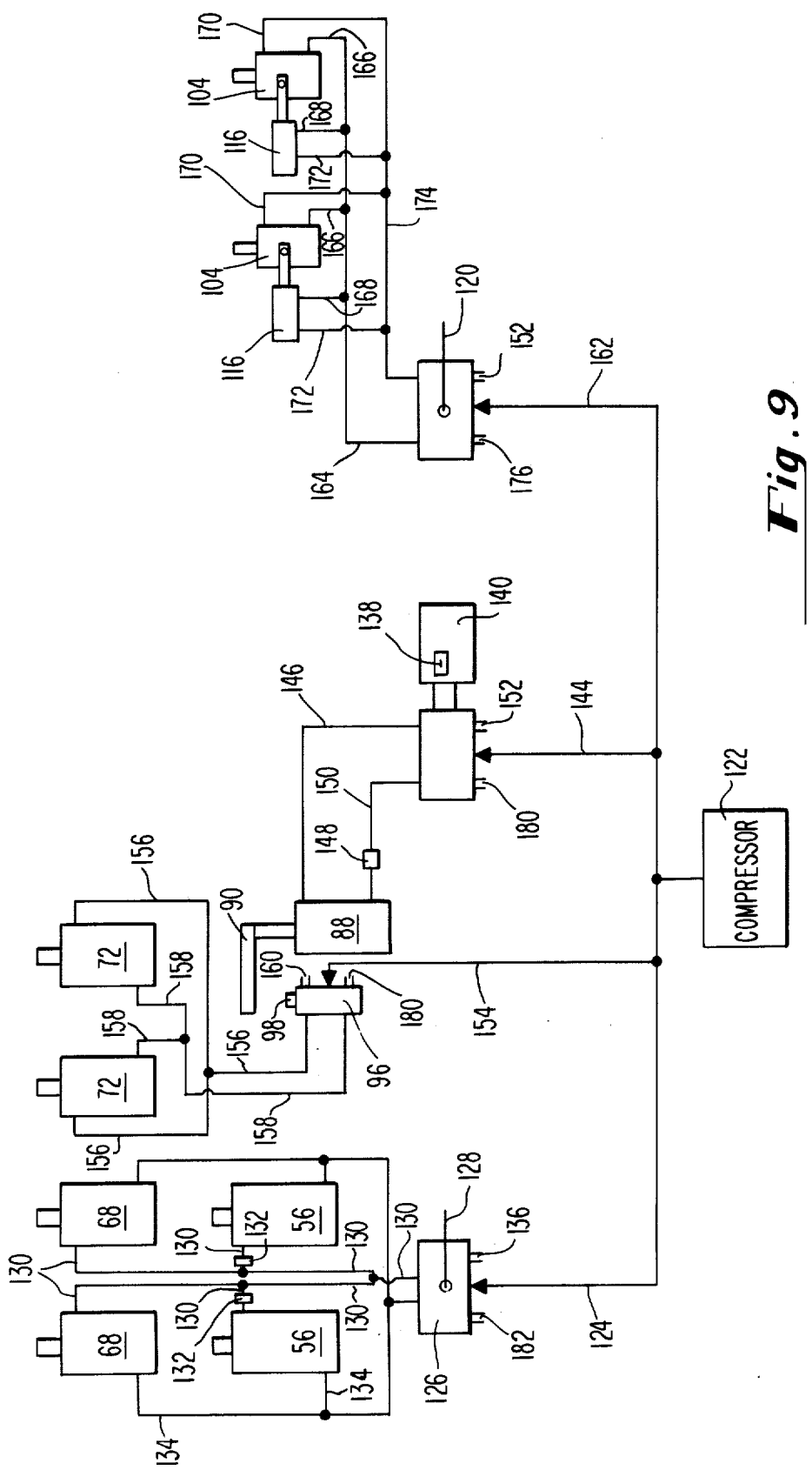
FIG. 9 is a circuit diagram of the circuitry employed in the apparatus of this invention.

Referring to FIG. 9, compressed air is directed from an air compressor 122 through line 124 into a conventional two-position mechanical control valve 126. The control valve is activated by a control arm 128 to direct the compressed air through lines 130 for retracting pneumatic cylinders 56 and 68 to lower the transport table 52 and the hold-down platen 66, respectively, to the position shown in FIG. 5. During this operation the compressed air enters each of the pneumatic cylinders 56 through a single-direction speed control device 132 which is ineffective to retard the flow of air entering the pneumatic cylinders 56 from lines 130. As the pneumatic cylinders 56 and 68 are retracted the air beneath the piston rods is forced out of the cylinders through lines 134, and out exit orifice 136 of the control valve 126.

At this point in the operation the laminated blank 10 is firmly clamped on the work-supporting bed 62 and the transport table 52 is in its lowered position to permit operator access to the apparatus 50 for the subsequent forming operation. The operator then engages handle 76 of the bend bar 70, and manually pivots said bend bar about its journaled connection 74 to the position shown in FIG. 5. The chain 80 is then connected to the post 94 associated with the pneumatic cylinder 88 (FIGS. 5 and 8).

Figure 6:
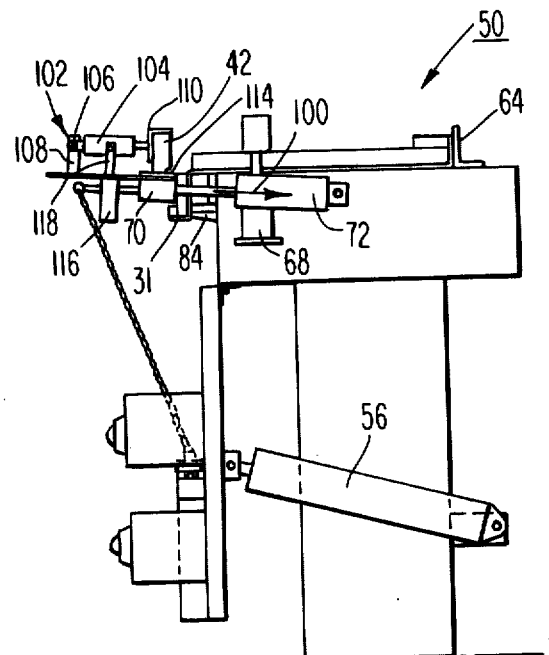

Referring to FIG. 9, a mechanical toggle switch 138 is manually activated to trigger a preset timing cycle of a variable electric timer 140. At the end of the preset timing cycle an electrically operated control valve 142 is triggered to direct compressed air, which enters the control valve 142 from the air compressor 122 through line 144, through line 146 for retracting the pneumatic cylinder 88. Retraction of the pneumatic cylinder 88 forces the air beneath the piston rod of said cylinder to pass through a single-direction speed control device 148 to retard the flow of air therethrough, whereby the pneumatic cylinder 88 is retracted slowly for positively and slowly pulling the bend bar 70 about its pivot connection 74 to wrap the side section 31 of the laminated blank 10 about the surface of the heating rod 82 (FIG. 6). The air which exits from the pneumatic cylinder 88 from the underside of the piston rod thereof passes through the speed control device 148, line 150, and exits from the control valve 142 through exit orifice 152.

Upon retraction of the pneumatic cylinder 88, the switch-actuating abutment 90 which is associated with said pneumatic cylinder 88 depresses the actuation button 98 of control valve 96 (FIGS. 8 and 9). The control valve 96 is a conventional two-position mechanical control valve of substantially the same construction as the control valve 126. When the actuation button 98 is depressed, compressed air, which enters the control valve 96 through line 154, is directed through lines 156 for retracting the pneumatic cylinders 72 which are connected to the bend bar 70. As the pnematic cylinders 72 retract, the air beneath the piston rods is forced through lines 158, and out exit orifice 160 of the control valve 96. The retraction of pneumatic cylinders 72 moves the bend bar 70 in the direction indicated by arrow 100 in FIG. 6 to firmly pull the bent section 31 of the laminated blank 10 into engagement with the back splash stop 84.

By automatically operating the bend bar through the interaction of pneumatic cylinders 88 and 72, in the manner described above, operator error is eliminated, and perfectly formed back splashes are consistently formed.

At this point in the operation the operator positions the cove stick 42 on the cove stick supporting platform 114 underlying the angle iron 110. The operator then applies a twin bead of hot-melt adhesive (not shown) to the cove defining side surfaces 38 and 40 of the support base 114 of the laminated blank 10. The twin bead of hot-melt adhesive can be applied by any suitable device, such as a Nordson hand hot-melt applicator. Upon completion of the adhesive applying operation, which takes about six seconds, the operator manually activates control are 120 (FIGS. 1 and 9) of mechanical control valve 134 to direct compressed air, which enters said control valve 134 through line 162, through feeder line 164 and branch lines 166 and 168 to simultaneously extend pneumatic cylinders 104 and retract pneumatic cylinders 116. The mechanical control valve 134 is a conventional two-position control valve which is operated substantially in the same manner as mechanical control valves 96 and 126 described earlier. As the pneumatic cylinders 104 extend and the pneumatic cylinders 116 retract air exits from said cylinders through branch lines 170 and 172, respectively, and then through feeder line 174 and out exit orifice 176 of the control valve 134.

Figure 7:
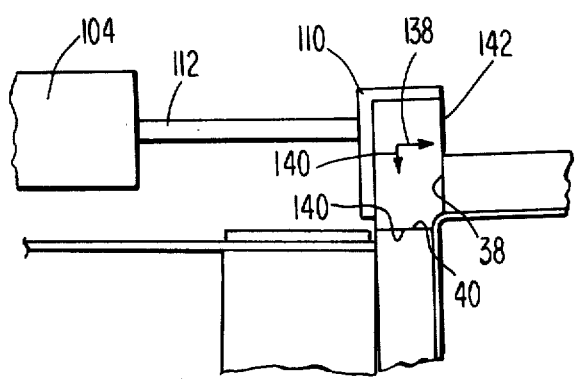
FIG. 7 is an enlarged view showing the final step of inserting the cove stick into a cove formed at the bend junction of the laminated blank.

The simultaneous extension of pneumatic cylinders 104 and retraction of pneumatic cylinders 116 applies a force to the cove stick 42 through the angle iron 110 in the directions indicated by arrows 138 and 140, respectively, (FIG. 7) to firmly press surfaces 142 and 140 of the cove stick into engagement with the cove defining surfaces 38 and 40, respectively, of the support base 14.

After allowing about ten seconds for the hot-melt adhesive to set up, the control arm 120 is activated to change the direction of air flow through the mechanical control valve 134. Specifically, compressed air will be directed into the pneumatic cylinders 104 and 116 through the feeder line 174 and its associated branch lines 170 and 172, and will be directed out of these cylinders through branch lines 166, 168, feeder line 164 and out exit orifice 178 of the control valve 134. During this operation the pneumatic cylinders 104 are retracted and the pneumatic cylinders are extended to position the cove stick inserting assembly 102 as shown in FIG. 6.

The mechanical toggle switch 138 of the variable electric timer 140 is then activated to trigger the electrical control valve 142 for causing a reversal in air flow through the pneumatic cylinder 88. Specifically, compressed air is directed into the pneumatic cylinder 88 through line 150, and out of said pneumatic cylinder 88 through line 146, and through exit orifice 180 of the control valve 142. The speed control device 148 is ineffective during this phase of the operation, and therefore the pneumatic cylinder 88 is rapidly extended to remove the tension on chain 80.

As the pneumatic cylinder 88 extends the actuation button 98 of the mechanical control valve 96 is released to cause a reversal in air flow through the pneumatic cylinders 72. Specifically, when the actuation button 98 is released, compressed air will be directed into the pneumatic cylinders 72 through lines 158, and out of said cylinders through lines 156 and through exit orifice 180 of said control valve 96. This operation extends the pneumatic cylinder 72 to release its pressure against the bent section of the laminated blank 10. The chain 80 is then disconnected from the post 94 associated with the pneumatic cylinder 88, and the bend bar 70 is manually moved to its vertical position shown in FIG. 4.

The control arm 128 of the control valve 126 is then activated to cause a reversal in air flow through said control valve 126. During this operation, air enters the pneumatic cylinders 56 and 68 through lines 134 to thereby extend said cylinders, and the air on the opposite side of the piston rods exits from the pneumatic cylinders 56 and 68 through lines 130 and exit orifice 182 of the control valve 126. The air exiting each pneumatic cylinder 56 passes through a speed control device 132 which is effective to retard the flow of air out of the pneumatic cylinders 56 so that the transport table 52 is raised slowly to permit removal of the formed countertop 30 from the apparatus 50 prior to said table 52 reaching its fully upright position shown in FIGS. 1 and 4. In this connection, the air exiting from the pneumatic cylinders 68, which operate the hold-down platen 66, does not pass through any speed control device, and therefore, the hold-down platen is raised rapidly to release the formed countertop 30 so that it can be removed prior to the transport table 52 reaching its fully upright position.

After the countertop 30 is removed from the apparatus, a new laminated blank 10 can be positioned on the transport table 52, and the above described operation repeated.

Having described my invention, I claim:

1. An apparatus for forming countertops and the like from a laminated blank having a thermoplastic sheet adhered to a support base, said apparatus including:
   A. a work-supporting bed for supporting the laminated blank with a side section of said blank extending outwardly beyond a front side margin of said bed;
   B. a bend bar movably mounted with respect to the work-supporting bed to force the side section of the laminated blank over the front side margin of said bed to form said side section into a back splash; and C. a cove stick inserting assembly connected to, and movable with said bend bar, said assembly including support means for supporting a cove stick adjacent a cove formed at the bend junction of the laminated blank after the bend bar has been moved to form the back splash, force transmitting means overlying a rear and upper surface of the cove stick when said cove stick is positioned on the support means of said assembly, a first set of fluid-actuated cylinders for moving said force transmitting means to apply a forward force to the rear surface of the cove stick, a second set of fluid-actuated cylinders for moving said force transmitting means to apply a downward force to the upper surface of the cove stick and valve means for actuating said first and second sets of cylinders to apply both a forward force and a downward force to the cove stick for inserting the cove stick into the cove and pressing surfaces of said cove stick into engagement with cove-defining surfaces of the support base disposed on opposite sides of the bend junction.

2. The apparatus according to claim 1, including fluid-actuated pressure means for forcing the bend bar against the side section of the laminated blank to form the back splash.

3. The apparatus according to claim 1, wherein the bend bar is connected to fluid-actuated cylinders that are rotatably journaled to fixed frame work of said apparatus, said apparatus including fluid-actuated pressure means for moving the bend bar in an arcuate path about the journaled connection of the fluid-actuated cylinders to which the bend bar is connected to bend the side section of the laminated blank over the front side margin of the work-supporting bed, valve means for controlling the operation of said rotatably journaled fluid-actuated cylinders, and valve actuation means associated with the fluid-actuated pressure means that arcuately moves the bend bar to energize the valve means after arcuate movement of the bend bar has been achieved to thereby retract the rotatably journaled fluid-actuated cylinders to move the bend bar linearly with respect to the journaled connection of said cylinders to force the bent section of the laminated blank toward a side wall adjacent the front of the work-supporting bed to complete the formation of the back splash.

4. The apparatus according to claim 3, including a transport table adjacent the front side of the work-supporting bed, said table being rotatably journaled to fixed frame work for movement between upper and lower positions, said tranport table being disposed in its upper position to support the laminated blank for placement on the work-supporting bed, and being disposed in its lower position during the bending and cove stick inserting operations, the fluid-actuated pressure means that arcuately moves the bend bar and the valve means that controls the operation of the rotatably journaled fluid-actuated cylinders both being mounted on said transport table.

5. The apparatus according to claim 4, including fluid-actuated pressure means for moving said transport table between its upper and lower positions, a hold-down platen overlying the work-supporting bed, fluid-actuated cylinders mounted to fixed frame work and connected to the hold-down platen for moving said hold-down platen between an upper position to permit insertion of a laminated blank on the work-supporting bed, and a lower position for clamping the laminated blank against said bed, and valve means for controlling the operation of the fluid-actuated pressure means that moves the transport table and the fluid-actuated cylinders that move the hold-down platen to simultaneously move said table and platen to either their upper positions or to their lower positions.

6. The apparatus according to claim 5, wherein said fluid-actuated pressure means that arcuately moves the bend bar is actuated to force the bend bar against the side section of the laminated blank when the transport table is in its lower position.

7. The apparatus according to claim 1, wherein the force transmitting means of the cove stick inserting assembly includes an angle iron overlying a rear and upper surface of the cove stick when said cove stick is positioned on the support means of said assembly, said first set of fluid-actuated cylinders connected to said angle iron for moving said angle iron linearly with respect to said first set of cylinders, and said second set of fluid-actuated cylinders operably connected to said first set of cylinders for arcuately moving said first set of cylinders about journaled connections of said first set of cylinders, the valve means for actuating both sets of cylinders being operative to extend said first set of cylinders and retract said second set of cylinders, whereby said angle iron connected to said first set of cylinders engages the rear and upper surfaces of said cove stick to press said cove stick in a forward and downward direction into engagement with the cove-defining surfaces of the support base that are disposed on opposite sides of the bend junction.

8. An apparatus for forming countertops and the like from a laminated blank having a thermoplastic sheet adhered to a support base, said apparatus including:
A. a work-supporting bed for supporting the laminated blank with a side section thereof extending outwardly beyond a front side margin of said bed;
B. a bend bar movably mounted with respect to the work-supporting bed to force the side section of the laminated blank over the front side margin of said bed to form said side section into a back splash;
C. fluid-actuated cylinders rotatably journaled to fixed frame work and connected to said bend bar;
D. fluid-actuated pressure means for moving the bend bar in an arcuate path about the journaled connection of the fluid-actuated cylinders to bend the side section of the laminated blank over the front side margin of the work-supporting bed;
E. valve means for controlling the operation of said fluid-actuated cylinders, and valve-actuation means associated with the fluid-actuated pressure means that arcuately moves the bend bar for energizing the valve means after arcuate movement of the bend bar has been achieved to retract the fluid-actuated cylinders and thereby move the bend bar linearly with respect to the journaled connection of the cylinders to force the bent section of the laminated blank toward a side wall adjacent the front of the work-supporting bed to complete the formation of the back splash.

9. The apparatus according to claim 8, including a transport table adjacent the front side of the work-supporting bed, said transport table being rotatably journaled to fixed frame work for movement between upper and lower positions, said transport table being disposed in its upper position to support the laminated blank for placement on the work-supporting bed and being disposed in its lower position during the bending of the laminated blank to form the back splash, the fluid-actuated pressure means that arcuately move the bend bar and the valve means that controls the operation of the fluid-actuated cylinders that are connected to said bend bar being mounted on said transport table.

10. The apparatus according to claim 9, including fluid-actuated pressure means for moving said transport table between its upper and lower positions, a hold-down platen overlying the work-supporting bed, fluid-actuated cylinders mounted to fixed frame work and connected to the hold-down platen for moving said hold-down platen between an upper position to permit insertion of a laminated blank on the work-supporting bed, and a lower position for clamping the laminated blank against said bed, and valve means for controlling the operation of the fluid-actuated pressure means that moves the transport table and the fluid-actuated cylinders that move the hold-down platen to simultaneously move said table and platen to either their upper positions or to their lower positions.

11. The apparatus according to claim 8, including a cove stick inserting assembly connected to, and movable with said bend bar, said assembly including support means for supporting a cove stick adjacent a cove formed at the bend junction of the laminated blank after the bend bar has been moved to form the back splash, and fluid-actuated pressure means for inserting the cove stick into the cove and pressing surfaces of said cove stick into engagement with cove-defining surfaces of the support base disposed on opposite sides of the bend junction.

* * * * *